May 12, 1970 R. E. PACKARD 3,512,134
APPARATUS FOR PERFORMING FILE SEARCH IN A DIGITAL COMPUTER
Filed April 3, 1967
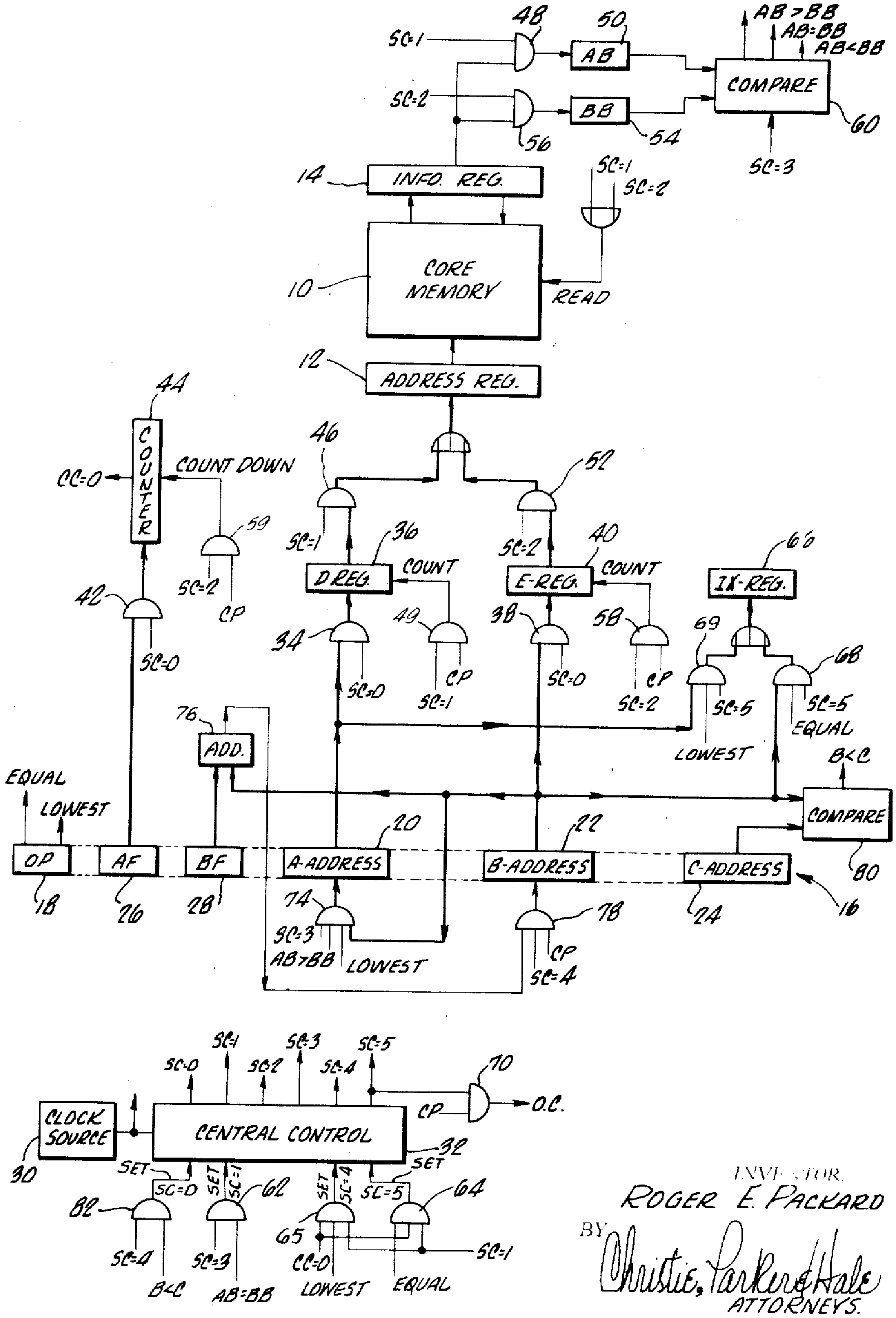
INVENTOR.
ROGER E. PACKARD
BY Christie, Parker & Hale
ATTORNEYS.

United States Patent Office 3,512,134

Patented May 12, 1970

3,512,134

APPARATUS FOR PERFORMING FILE SEARCH IN A DIGITAL COMPUTER

Roger E. Packard, Glendora, Calif., assignor to Burroughs Corporation, Detroit, Mich., a corporation of Michigan Filed Apr. 3, 1967, Ser. No. 628,001
Int. Cl. G06f 7/10
U.S. Cl. 340—172.5 2 Claims

ABSTRACT OF THE DISCLOSURE

There is described a digital computer having a three address type command format in which a special command produces a search of a group of records in a file in memory for a group of characters in each record equal to a search key or for the lowest group of characters in the file. The address of the first record key at the start of the file, the address of the end of the filed, and the address of the search key to be used are specified as part of the command. When the item being searched is located, its address is stored in an index register for future reference.

BACKGROUND OF THE INVENTION

The need to search through files to find a particular item within each record in the file is well recognized. In the past this has been done by providing a scanning of each record in the file for the particular item. This is a time consuming operation, particularly where it is necessary to locate all the records in a particular file in which a specified item is present, or to find the record in which the item searched has the lowest value, for example. The present invention is directed to a computer in which all the records in file can be examined, in response to a single command, to locate a specified key in each record that is either equal to a search key in the command or which is the lowest record key in the file.

SUMMARY OF THE INVENTION

In brief, the present invention is directed to a computer in which a single command causes a specified group of characters, called a record key, to be read from each record comprising a file stored in memory. Each record key is compared with a search key to find a record key equal to the search key. If the lowest value in the file is sought, each record key read out of the memory file in turn becomes the next search key whenever it is lower in value than the previous search key. The operation continues until the last record key in the file is examined, at which time the search key is equal to the lowest value record key in the file. Its address in memory is then placed in an index register to complete the search operation.

A BRIEF DESCRIPTION OF THE DRAWINGS

The single figure is a block schematic diagram of one embodiment of the present invention.

DESCRIPTION OF THE PREFERRED EMBODIMENT

Referring to the drawing in detail, the numeral 10 indicates generally a random access memory, such as a core memory, in which information in digitally coded form is stored in addressable locations. The address of any selected location in the core memory 10 is identified by the contents of an address register 12. Information is read out of the memory or written into the memory from an information buffer register 14.

As in any conventional internally programmed computer the core memory 10 may contain a list of instructions or commands which are normally transferred from the core memory in sequence one at a time and placed in a command register, such as indicated generally at 16. The manner in which a command is fetched from memory and placed in the command register 16 forms no part of the present invention.

Typically, the command includes an OP portion which is stored in a corresponding section 18 of the command register 16. The OP portion of the command specifies the particular operation to be performed by the computer in response to the command. Assuming a three address type of machine, the command will also include an A-address, a B-address, and a C-address, which are stored respectively in the sections 20, 22 and 24 of the command register 16. For arithmetic operations, for example, the A-address and B-address designate the addresses of two operands in the core memory 10 which are involved in the execution of the particular command. The C-address in turn designates the location in the core memory 10 where the result of the operation is stored.

In a character-type machine, the command also includes the length of each of the two operands specified by the A-address and B-address. An AF portion and the BF portion, forming sections 26 and 28 of the command register 16, respectively specify the length of the A-field and the B-field.

Execution of a particular command takes place in a sequence of operations synchronized with a clock source 30 and controlled by a central control unit 32. The central control unit 32 includes a sequence counter which is normally stepped through a sequence of states by successive clock pulses, designated CP, from the source 30. To provide for the filed search command operation of the present invention, six states of the central control unit 32 are provided, designated as $SC=0$ through $SC=5$. While the sequence counter in the central control unit 32 normally advances from one state to the next, it may also be set to any state from any other state at the clock pulse time by applying an input level to the particular stage of the sequence counter which establishes the desired output state of the central control unit. Such a control unit is well known in the art, as shown by U.S. Pat. 3,222,649.

Assuming that a file search command is in the register 16 in accordance with the teaching of the present invention, the OP section 18 specifies by one of two outputs that the search is to be made on an "equal" condition or a "lowest" condition. The contents of the A-address section 20 specifies the address of a search key stored in the core memory 10. The contents of the AF section 26 specifies the number of characters in the search key. The B-address section 22 of the register 16 contains the address of the first record key in the core memory 10. It is assumed, in the preferred embodiment, that all records in the file are of equal length. Section 28 of the register 16 specifies the number of characters in one record in the file on which the search is being made. The C-address section 24 of the register 16 specifies the address of the end of the file.

During the initial state $SC=0$ of the central control unit 32, the address of the search key is transferred from the A-address section 20 by means of an AND circuit 34 to a D-register 36. At the same time, the address of the start of the first record key in the core memory 10 is transferred from the B-address section 22 by means of an AND circuit 38 to an E-register 40. The length of the search key is also transferred from the AF section 26 by means of an AND circuit 42 in response to the $SC=0$ state, to a counter 44. The next clock pulse automatically advances the central control unit 32 to the $SC=1$ state.

During the $SC=1$ state, the address of the search key is transferred from the D-register 36 by means of an AND circuit 46, to which the $SC=1$ state is applied, to the address register 12. The contents of the specified address location in the core memory 10 are transferred to the information register 14 by applying the $SC=1$ state to the Read input of the memory 10. In a character-type machine, this is the most significant character of the search key and it is transferred by an AND gate 48 to a character buffer register (AB) 50 for storage. At the end of the clock period, the D-Register is counted up one by the output of an AND circuit 49 to which the $SC=1$ state and a CP are applied. Unless the counter 44 is zero at this time indicating that the full search key has been read out of core memory 10, the central control unit 32 automatically advances from the $SC=1$ state to the $SC=2$ state.

During $SC=2$ state, the address of the start of the record key is transferred from the E-register 40 by means of an AND circuit 52 to the address register 12. The addressed character is read out of core memory 10 by applying the $SC=2$ state to the Read input of the memory and is transferred from the information buffer register 14 to a character buffer register 54 through an AND circuit 56 to which the $SC=2$ state is also applied. At the same time the E-register 40 is counted up one to the next address in sequence by the output of an AND circuit 58 to which the $SC=2$ state and a clock pulse are applied. Also the counter 44 is counted down one by the output of an AND circuit 59 to which is applied the $SC=2$ state and a clock pulse. The central control unit then advances to the $SC=3$ state.

During the $SC=3$ state, a comparison is made between the search key character in the buffer register 50 and the first character from second key stored in the buffer register 54. This is done by a comparison circuit 60 having one of three output levels which indicate that contents of the buffer register 50 is higher than the content of the buffer register 54, designated $AB>BB$, or that the content of the buffer register BB is higher than the content of the buffer regeister 50, designated $AB<BB$, or that the contents of the two buffer registers 50 and 54 are equal, designated $AB=BB$.

If the output of the comparison circuit 60 indicates that the contents of the two buffer registers 50 and 54 are equal, the central control unit 32 is reset to the $SC=1$ state in order that the next character in the record key can be compared with the next character in the search key. The resetting is provided by the output of an AND circuit 62 to which the $SC=3$ state is applied along with the $AB=BB$ state from the comparison circuit 60. As a result, the $SC=1$, the $SC=2$ and the $SC=3$ states are repeated until either of two conditions takes place. One condition is that the counter 44 will be counted down to zero, indicating that the comparison on the full search key and record key has been completed. If the operation calls for a search of an "equal" condition, the search is completed during the $SC=1$ state. Accordingly the central control unit 32 is set to the $SC=5$ state from the $SC=1$ state. This is accomplished by an AND circuit 64 which senses that the central control unit is in the $SC=1$ state, that the counter 44 is in the $CC=0$ condition and that the output of the OP section 18 indicates an "equal" search. If the operation calls for a search of the "lowest" record, an AND circuit 65 also senses $CC=0$ and $SC=1$ to set the control unit 32 to $SC=4$, which state is described below.

During the $SC=5$ state, the address in the B-address section 22 of the register 16 is transferred to an index register 66 by means of an AND circuit 68. The AND circuit 68 senses that the central control unit is in the $SC=5$ state and that the search for "equal" condition is specified by the OP section 18 if the operation calls for a search of the lowest record key, an AND circuit 69 senses this condition and also senses the $SC=5$ state and if those conditions are true sets the address in the A-address section 20 into the IX-register 66. The next clock pulse is applied to an AND circuit 70 together with the $SC=5$ state to provide an Operation Complete pulse, designated OC, indicating completion of the execution of the command.

The other condition that might arise by comparing successive digits of the search key word and the record key in each record of the file is that the two digits would not be equal, as indicated by the comparison circuit 60 during the $SC=3$ state. If the two digits in the buffer registers 50 and 54 are not equal when the central control unit 32 is in the $SC=3$ state, then the central control unit 32 automatically advances to the $SC=4$ state instead of being reset back to the $SC=1$ state. However, during the $SC=3$ state if the comparison circuit 60 indicates that the character of the search key in the buffer register 50 is higher than the character in the buffer register 54, as indicated by the $AB>BB$ output of the comparison circuit 60, and if the OP section 18 indicates that a search on the "lowest" condition is called for, the address in the B-register 22 is transferred to the A-register 20. The transfer is made through an AND circuit 74 which senses that the $SC=3$ state pertains, that the $AB>BB$ output of the comparison circuit 60 is true and that the "lowest" condition is specified by the OP section 18 of the command. Thus the address of the record key in the file becomes the address of the search key word, so that the search is continued using the word in the file as the search key word.

With the central control unit 32 advanced to the $SC=4$ state, the address in the B-register 22 is incremented by the record length information stored in the BF section 28 of the register 16. This is accomplished by means of an adder 76 which adds the length information to the address. The output of the adder 76 is stored in the B-address section 22 of the register 16 by means of an AND circuit 78 which senses the $SC=4$ state and the next clock pulse. Thus the address of the record key in the next record of the file is provided in the B-address section 22.

If the search operation at this point has not reached the end of the file in the core memory 10, central control unit 32 is returned to the $SC=0$ state and the above operations are repeated on the next record key in the file, as identified by the incremented address in the B-address portion 22 of the register 16. A comparison circuit 80 compares the address in the B-address section 22 with the end-of-file address in the C-address section 24 of the register 16. The output of the comparison circuit 80 is true if the end-of-file address is higher than the second key address, indicated as $B<C$. The central control unit 32 is set to the $SC=0$ state by the output of an AND circuit 82 to which the $SC=4$ state is applied and the $B<C$ state in the comparison circuit 80 is applied.

Central control unit 32 advances through the various states in the manner described above until the B-address is incremented so as to be equal to or higher than the value of the C-address, so that the output of the comparison circuit 80 is no longer true. Then instead of being reset to the $SC=0$ state, the central control unit 32 automatically advances from the $SC=4$ to the $SC=5$ state.

There is described a digital computer having a three address type command format in which a special command produces a search of a file in memory for a word equal to a key word or for the lowest word relative to the key word. The start of the file, the length of the file an the key word are specified as part of the command. When the word being searched is determined, its address is stored in an index register for future reference.

What is claimed is:

1. A file search system for determining the location of the lowest order record key in the file, comprising:
   an addressable memory for storing digitally coded items in separately addressable locations, the memory storing a group of items constituting a file of records, all of the records having the same number of items, one item in each record being a record key for identifying the particular record;

a first register for storing the address of a record key item in the first record of the file;

a second register for storing the address of a search key in the memory;

a third register for storing the number of items in each of the records;

comparing means responsive to two digitally coded inputs for indicating if the value of one input is equal to or greater than the other input;

means responsive to the addresses in the first and second registers for repeatedly reading out the search key and record key item in the addressed locations in the memory to the respective inputs of the comparing means;

means for incrementing the address in the first register by the contents of the third register with each repeated operation of said reading out means, whereby the record key items of successive records are read out to one input of the comparing means; and means responsive to the output of the comparing means after each comparison when the record key item is less than the search key for transferring the contents of the first register to the second register before the contents of the first register is incremented by said incrementing means.

2. The system defined in claim 1 further including a fourth register for storing the address of the last item in the file in memory, an index register, a comparing unit connected to said first register and fourth register for comparing the address of the last item of the file with the record key address and time it is incremented by said incrementing means, and means for transferring the contents of the second register to the index register when the comparing unit indicates the address in the first register is not less than the address of the third register.

References Cited

UNITED STATES PATENTS

| | | | |
|---|---|---|---|
| 3,408,631 | 10/1968 | Evans et al. | 340—172.5 |
| 3,417,375 | 12/1968 | Packard | 340—172.5 |
| 2,947,976 | 8/1960 | Mendelson et al. | 340—172.5 |
| 3,107,343 | 10/1963 | Poole | 340—172.5 |
| 3,149,309 | 9/1964 | Schmidt | 340—172.5 |
| 3,214,736 | 10/1965 | Glaser | 340—172.5 |
| 3,311,887 | 3/1967 | Muroga | 340—172.5 |
| 3,339,181 | 4/1967 | Singleton et al. | 340—172.5 |

PAUL J. HENON, Primary Examiner

H. E. SPRINGBORN, Assistant Examiner

PO-1050
(5/69)

UNITED STATES PATENT OFFICE
CERTIFICATE OF CORRECTION

Patent No. 3,512,134 Dated May 12, 1970

Inventor(s) Roger E. Packard

It is certified that error appears in the above-identified patent and that said Letters Patent are hereby corrected as shown below:

CLAIM 1.

Column 4, Line 72- "for" has been deleted.
Column 5, Line 2 - "that" has been substituted for "the";
Line 3 - "initially" has been substituted for "for" and "the" has been substituted for "a";
Line 5 - "having stored therein" has been substituted for "for storing";
Line 6 - "which has been stored" has been inserted after "key";
Line 7 - "having stored therein" has been substituted for "for storing";
Line 9 - "first and second" has been substituted for "two";
Line 10- "the first" has been substituted for "one";
Line 11- "or less than the second" has been substituted for "the other";
Line 14- "item" has been changed to "items";
Line 15- "respectively" has been inserted after "memory" and "first and the second" has been substituted for "respective"; and
Line 21- "the second" has been substituted for "one".

CLAIM 2.

Column 6, Line 4 - "having stored therein" has been substituted for "for storing";
Line 6 - "said" has been inserted before "fourth" and "for" has been deleted;
Line 8 - "at the" has been substituted for "and";
Line 11- "that" has been inserted after "indicates"; and
Line 12- "fourth" has been substituted for "third".

SIGNED AND SEALED

SEP 29 1970

(SEAL)
Attest:

Edward M. Fletcher, Jr.
Attesting Officer

WILLIAM E. SCHUYLER, JR.
Commissioner of Patents